June 9, 1953

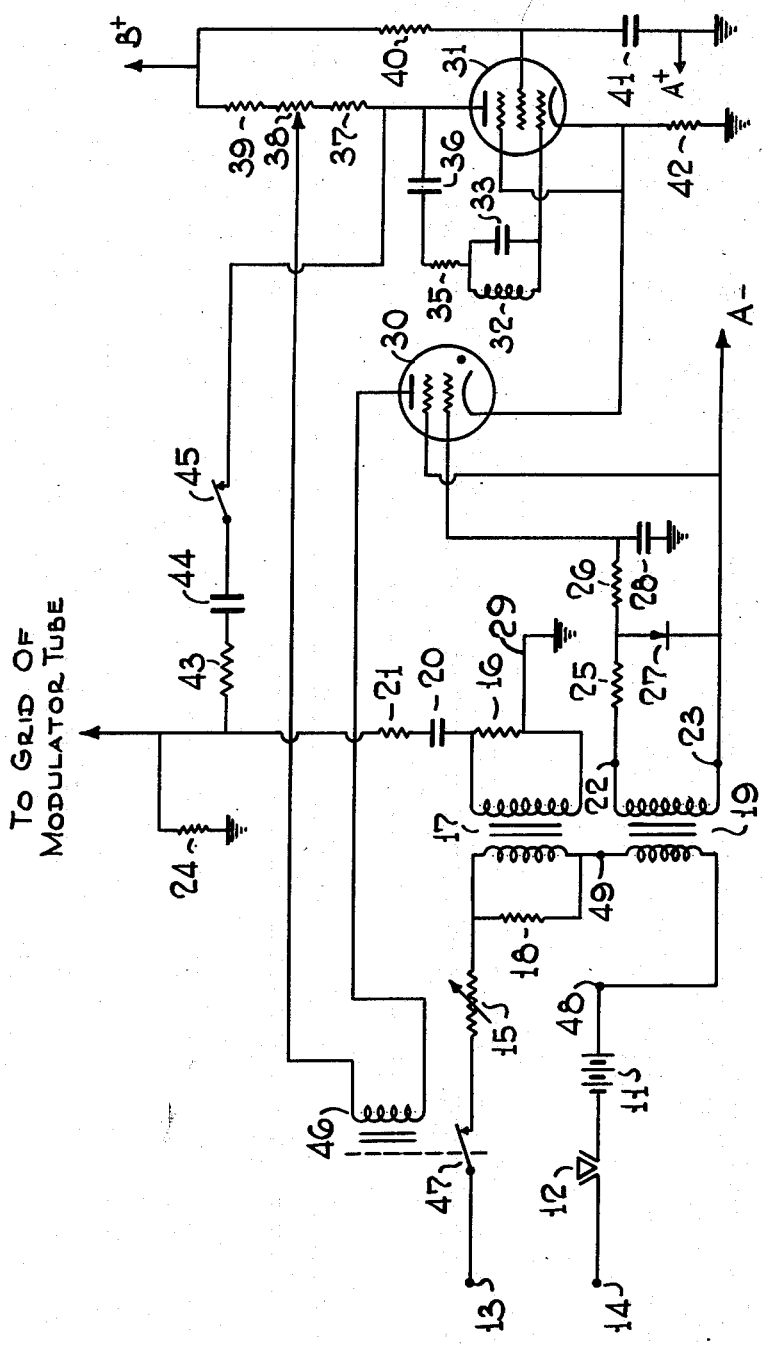

F. L. LAWRENCE 2,641,749

TIME BREAK RECORDING IN SEISMIC PROSPECTING

Filed Dec. 15, 1951

Franklin L. Lawrence Inventor

By W. O. Heilman Attorney

Patented June 9, 1953

2,641,749

UNITED STATES PATENT OFFICE 2,641,749

TIME BREAK RECORDING IN SEISMIC PROSPECTING

Franklin L. Lawrence, Tulsa, Okla., assignor to Standard Oil Development Company, a corporation of Delaware Application December 15, 1951, Serial No. 261,901

7 Claims. (Cl. 340—15)

This invention relates to improvements in seismograph circuits and more particularly to improved means and methods for recording the instant an explosion takes place during the shooting step in seismic prospecting.

The general method of seismic exploration wherein a seismic disturbance is initiated at a selected point in the earth and reflected seismic waves are detected at a plurality of points spread out in a desired pattern has long been known. Briefly the method consists in picking up the detected waves with sensitive detectors known as geophones, which translate the detected motion into electrical impulses which are suitably amplified and recorded on a seismograph. The conventional seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided by well known means with suitable timing marks so that when the seismograph record or seismogram is later examined it is possible to determine the length of time required for the arrival of seismic waves at any particular point on the earth's surface, either directly from the source or by reflection from the underlying strata. From other data obtained in the area being studied, such as seismic wave velocities in the various earth layers, it is then possible to estimate the depths of the various reflecting substrata.

In order that the seismograph computer can make accurate calculations from the seismograph record, it is essential that the instant the original seismic disturbance is initiated be indicated exactly on the record. This is usually done when the seismic disturbance is initiated by an explosive shot by recording the instant when the firing circuit is disrupted by the explosion. It is frequent practice to record on a single seismograph channel both the make and the break in the firing circuit followed by the signal received by the up-hole geophone, that is a geophone placed near the shot hole to determine the travel time from this shot to the earth's surface, this information also being needed for the computer's calculations. It often happens, however, that after the charge has been detonated the cap wires in the shot hole will be brought into intermittent momentary contact, which will result in so-called noise in the circuit and obscure the time break and up-hole geophone pulses on the record, making it necessary to repeat the shooting and recording steps for the particular location involved.

It is an object of the present invention to provide a circuit that will furnish a positive signal indicative of the instant of firing of the seismic shot while preventing subsequent disturbance of the record which would obscure the record of the time break and of later events. Another object is to provide a circuit that will ensure that the shooting voltage will be removed from the shooting circuit immediately after detonation of the electric blasting cap that sets off the seismic charge.

Still another object is to provide a method of recording the instant of closing the shooting circuit, the instant the circuit is opened by the seismic shot and the instant the first impulse is received by the uphole geophone, all on a single trace, without having any one of the recorded events interfere with any of the other recorded events. These and other objects of the invention and the manner in which it is to be performed will become apparent from the following description when read in conjunction with the accompanying drawing in which:

Figure 1 is a circuit diagram embracing the invention;

Figure 3:
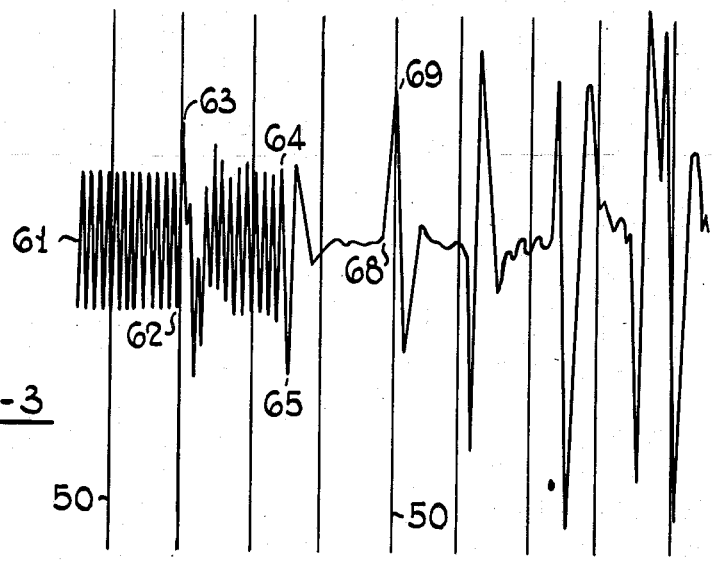
Figure 3 is a seismograph trace similar to that of Figure 2 but showing the effect of disconnecting the firing circuit immediately after detonation of the charge in accordance with this invention.

Referring now to Figure 1, current to detonate the seismic charge is furnished from a battery or other power source 11 through terminals 13 and 14, the circuit being closed when desired by pressing shooting button 12. A variable resistor 15 is placed in the circuit to adjust the amount of current fed to the detonating cap and thus control the time elapsing between the pressing of the button and the firing of the shot, in other words the time between the "make" and "break." Any transient that appears in the firing circuit will be picked up by transformers 17 and 19, the former feeding a signal through coupling capacitor 20 to the grid of a modulator tube in a radio transmitting circuit. Signals from the radio transmitter are picked up by a receiver in the recording truck and recorded on one of the seismograph traces. Such equipment is conventional and need not be described in detail here. A fixed frequency tone signal is fed to the same modulator tube through coupling capacitor 44, the tone being supplied by an oscillator circuit comprising pentode 31 having its screen grid connected to a B+ supply through resistor 40 and through a by-pass capacitor 41 to ground and having a feedback circuit from plate to control grid through capacitor 36, resistor 35, choke 32 and capacitor 33. The two latter elements may be so chosen as to give a tone of, say 1000 cycles per second. Capacitor 36 and resistor 35 are selected so that the amount of feed-back will be proper for a sinusoidal output from the oscillator.

It will be noted that resistor 43 acts in conjunction with resistor 24 to furnish voltage divider action such that the tone fed by the tone oscillator circuit will provide 100% modulation of the carrier wave transmitted by the radio transmitter circuit. Likewise, resistor 21 acts in conjunction with resistor 24 to provide a similar voltage divider action so that the pulses from transformer 17 will be of proper size with respect to the amplitude of the tone from the oscillator. Thus when the firing circuit is closed the transient picked up by transformer 17 will momentarily disrupt the tone signal being sent by the radio transmitter. A similar transient of opposite polarity will be picked up by transformer 17 when the circuit is opened by firing of the charge. Resistors 16 and 18 are shunted across the primary and secondary windings of transformer 17 in order to damp the transient effect of the "make" and the "break" so that they will die out rapidly enough so as to not obscure the record of subsequent events.

Transients in the firing circuit will also be picked up by transformer 19 whose secondary winding feeds the firing grid of a thyratron 30, but the polarity of the circuit is arranged so that thyratron 30 will not be affected on the "make." To ensure further that the transient resulting from closing the firing circuit will not fire the thyratron a rectifier 27 is connected across the secondary winding of transformer 19 through isolating resistor 25 so that any transients resulting from closing the firing circuit will be shunted across the transformer 19. On the "break," however, the transient will be of opposite polarity and will trigger thyratron 30 so that current will be conducted from the cathode to the plate of the thyratron. To ensure that no small disturbances in the circuit will trigger the thyratron however, a filter comprising resistor 26 and capacitor 28 is inserted in the line to the firing grid. To prevent premature firing of the thyratron a negative A potential is applied to both grids of the thyratron. This potential may be from a 6 volt source, for example.

It will be noted that a common cathode resistor 42 is employed for both thyratron 30 and oscillator tube 31 so that when the thyratron is fired the cathode bias on tube 31 will be increased sufficiently with respect to the control grid of tube 31 to cut tube 31 off and thereby kill the tone. At the same time, current will flow through solenoid 46 since this is connected in series with the plate of the thyratron. Thus when the thyratron is fired, firing relay switch 47 will be opened, thereby preventing any further transients from appearing in the firing circuit even though the cap wires may short after the explosion. Thus on the "break" the tone will disappear from the record and will not reappear to distort the record or interfere with any other signals subsequently received. Relay 47 should have rapid response in order to obtain the full benefits of the invention and in general a relay should be selected that will act within about 1 millisecond after current is fed to it.

Resistors 37 and 39 and potentiometer 38 are inserted in the plate circuits of tubes 30 and 31. All three of these elements serve as the plate load resistor for tube 31, while resistor 39 and a selected portion of potentiometer 38 together with the solenoid 46 constitute the plate resistor for tube 30. Potentiometer 38 can be adjusted so that the voltage on the plate of tube 31 will not change when tube 31 is cut off in the manner described above. This is necessary so that a transient will not appear on the grid of the modulator tube when tube 31 is cut off.

Considerable leeway in the actual components of the circuit of Figure 1 is possible and the construction of such a circuit is a fairly simple matter for one skilled in the art of electronics. As a specific example of an operable circuit, oscillator tube 31 may comprise a 7C7 vacuum tube with cathode resistor 42 having a resistance of 2500 ohms. Capacitor 36 will have a capacitance of 0.01 microfarad and resistor 35 will have a resistance of 0.75 megohm. Choke 32 and capacitor 33 will be selected so their LC value will then furnish a tone of 1000 cycles per second. Resistor 40 will have a value of 0.24 megohm and capacitor 41 will have a capacitance of 0.1 microfarad. Resistor 37 will have a resistance of 68,000 ohms and potentiometer 38 and resistor 39 will each have a resistance of 10,000 ohms, a B+ supply of 180 volts being used. Resistors 21, 24 and 43 will have resistance values of 0.3, 0.24 and 1.1 megohms respectively. Capacitors 20 and 44 will have capacitances of 0.5 microfarad and 0.0001 microfarad respectively.

In the circuit feeding the thyratron 30, which may be a type 2051 thyratron, resistors 25 and 26 may have resistances of 10,000 and 100,000 ohms respectively and capacitor 28 a capacitance of 0.005 microfarad. The two transformers 17 and 19 will each have a 3.2 ohm primary winding and a 2000 ohm secondary winding, the primary damping resistor 18 having a resistance of 2 ohms and the secondary damping resistor 16 having a resistance of 51,000 ohms. With a potential source 11 of 6 volts a 5 ohm variable resistance 15 may be used. The resistance of the solenoid 46 in the one millisecond relay 47 will be 8000 ohms.

Some seismograph operators prefer that "telephone type" rather than "tone type" transients be recorded for the "make" and "break" kicks on the record, the telephone type transient being merely an upward or downward kick on a straight line record. The circuit of the present invention is readily converted to telephone type use simply by opening switch 45.

In a simpler embodiment of the invention, transformer 19 could be omitted and only transformer 17 used, in which event terminals 22 and 23 would be connected to the two ends of resistor 16, terminal 48 would be connected to terminal 49, and ground connection 29 omitted. The arrangement already described, however, in which separate transformers 17 and 19 are used, is preferred since transformer 19, being undamped, can have maximum sensitivity for triggering thyratron 30 whereas transformer 17 can be damped with resistors 16 and 18 so as to cause each transient to die down rapidly before the next transient appears and thereby prevent the transients from obscuring each other, as already mentioned.

Figure 2:
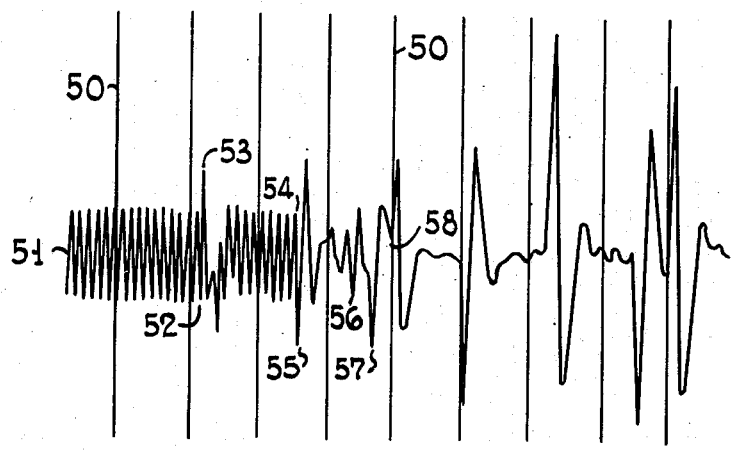
Figure 2 is an enlarged representative seismograph trace of a make, break, and up-hole geophone record showing the interference caused by circuit noise that results from contact of the lead wires after the seismic shot has been detonated.

The benefits of this invention are readily apparent from inspection of Figures 2 and 3 which are enlarged copies of representative seismograph traces showing the portion of the record that carries the make, break and uphole geophone pulses. Figure 2 shows a trace made using a conventional tone circuit for indicating the make and the break in the firing circuit without the benefit of the circuit disconnecting feature of the present invention. Parallel lines 50 are the conventional time lines. The trace made by the tone as received is indicated by numeral 51. The pulses indicating the make, that is the time at which the firing circuit was closed, appears as a sudden down-swing from point 54 to point 55. the break in the firing circuit is indicated by a sudden down-swing from point 54 to point 55. The uphole geophone kick is supposed to appear as the first sudden up-swing after the break and yet it will be noted that three such kicks appear, making it difficult to determine whether the upswing beginning at point 56 or that beginning at point 57 or point 58 is the proper impulse. By running a separate trace to record the uphole geophone kick for the purpose of investigating this problem, it was determined that the up-swing beginning at point 58 was the uphole geophone kick. The earlier kicks were presumed to be the result of shorting of the cap wires after detonation.

The trace shown in Figure 3 is similar in all respects to that of Figure 2 but represents the result of employing the circuit of the present invention which provides for opening the firing circuit after detonation of the shot as fully described above in connection with Figure 1. The make, appearing as an up-swing in trace 61 from point 62 to 63, the break, appearing as a down-swing from point 64 to point 65, and the uphole geophone kick, appearing as an up-swing from point 68 to point 69, are clearly shown and there is no confusion on the record.

It is not intended that this invention be limited by the specific embodiments described herein as many modifications thereof are possible without departing from its scope.

What is claimed is:

1. In combination, a firing circuit for an explosive charge, a source of current for said circuit, a signal source, means adding a pulse of selected polarity to said signal source upon closing of said firing circuit and a pulse of opposite polarity to said signal source upon opening of said firing circuit when said explosive charge detonates, auxiliary switch means in series with said firing circuit and means acting to open said auxiliary switch means upon generation of said pulse of opposite polarity.

2. In combination, a firing circuit for an explosive charge, a source of current for said circuit, a transformer having a primary winding in series with said firing circuit, signal transmitting means, means tying a secondary winding of said transformer to said signal transmitting means, a thyraton, means feeding a voltage of selected polarity to the firing grid of said thyratron from a secondary winding of said transformer, a relay actuated switch in series with said firing circuit and means feeding a voltage from the plate of said thyratron to said relay.

3. Combination according to claim 2 including a fixed tone oscillator feeding a tone to said signal transmitting means and means for killing said tone upon firing said thyratron.

4. In combination, a firing circuit for an explosive charge, a source of current for said circuit, a first transformer and a second transformer having primary windings in series with said firing circuit, signal transmitting means, means tying a secondary winding of said first transformer to said signal transmitting means, a damping resistor shunted across the primary winding of said first transformer, a damping resistor shunted across said secondary winding, a thyratron, means connecting a secondary winding of said second transformer to the firing grid of said thyratron and a relay actuated switch in series with said firing circuit, the relay of said switch being placed in series with the plate circuit of said thyratron.

5. Combination according to claim 4 including a fixed tone oscillator, means feeding the output of said oscillator to said signal transmitting means, and means for cutting off the output of said oscillator upon the firing of said thyratron.

6. Combination according to claim 5 wherein said oscillator includes a vacuum tube having a cathode circuit common to the cathode circuit of said thyratron, whereby firing of said thyratron will increase the cathode bias of said oscillator vacuum tube to cutoff.

7. Combination according to claim 4 including a rectifier shunted across the secondary winding of said second transformer whereby only transients of one selected polarity will fire said thyratron.

FRANKLIN L. LAWRENCE.

References Cited in the file of this patent

UNITED STATES PATENTS

| Number | Name | Date |
|---|---|---|
| 2,325,157 | Winterhalter | July 27, 1943 |
| 2,340,770 | Reichert | Feb. 1, 1944 |
| 2,435,903 | Ritzmann | Feb. 10, 1948 |